3,472,850
Patented Oct. 14, 1969

3,472,850
METHOD FOR THE PRODUCTION OF 2-SUBSTI-TUTED - 4 - AMINO - 5 - ACYLAMIDOMETHYL-PYRIMIDINE
Masaaki Tsurushima, Itami, and Kozo Yatani, Ashiya, Japan, assignors to Takeda Chemical Industries, Ltd., Osaka, Japan
No Drawing. Filed June 6, 1967, Ser. No. 643,847
Claims priority, application Japan, June 9, 1966, 41/37,497
Int. Cl. C07d 51/42; C07c 121/16; B01j 1/10
U.S. Cl. 260—256.4         3 Claims

ABSTRACT OF THE DISCLOSURE

Compounds of the formula

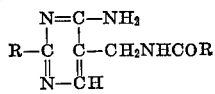

where R is methyl, ethyl or phenyl, are useful intermediates in the preparation of Vitamin $B_1$.

These intermediates are synthesized by reacting 1,2,3-trichloro-2-cyanopropane with the corresponding amidine of the formula

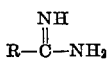

followed by hydrolysis.

---

This invention relates to a method for the production of compounds which are of great value for use as intermediates in the preparation of Vitamin $B_1$ and its derivatives.

More concretely stated, this invention relates to a method for the ready production of 2-substituted-4-amino-5-acylamidomethylpyrimidine in high yield which comprises reacting 1,2,3-trichloro-2-cyanopropane and an appropriate amidine, followed by hydrolysis.

The object of the present invention is to provide a novel method for the production of 2-substituted-4-amino-5-acylamidomethylpyrimidines useful as intermediates in the preparation of Vitamin $B_1$ and its derivatives.

The objective 2-substituted-4-amino-5-acylamidomethylpyrimidines correspond to the formula:

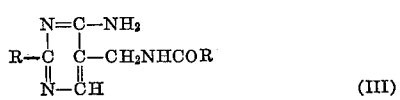

wherein R is methyl, ethyl or phenyl.

Other objects of the present invention will become apparent from the following descriptions and working examples. One of the starting materials in the present method is an amidine of the formula

wherein R has the same meaning as above.

The desired 2-substituted-4-amino-5-acylamidomethyl-pyrimidine of the Formula III is prepared by a reaction between 1,2,3-trichloro-2-cyanopropane of the Formula I and the corresponding amidine of the Formula II, followed by hydrolysis. The present reaction is quite unique and unexpected in this art. Without being bound thereto, it is thought that the present reaction proceeds according to the following scheme:

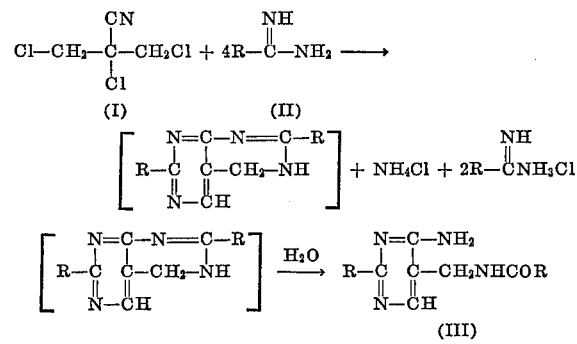

wherein R has the same meaning as above.

1,2,3-trichloro-2-cyanopropane (B.P. 79–80° C./10 mm. Hg; M.P. 23° C.), one of the starting materials in the present method is a novel compound, synthesized by the present inventors by allowing chlorine gas to act upon 3-chloro-2-cyanopropene under irradiation by rays havingr a wave-length of not longer than those of visible rays. The irradiation is carried out in per se conventional manner with rays having a wave-length of from 1000 A. to 7000 A., optimally at about 3000 A. to about 5000 A. and at a temperature of from 0° C. to about 100° C. and optimally at a temperature not in excess of about 30° C. Most conveniently employed for the irradiation is a high-pressure mercury-lamp although other ray sources may also be employed.

The reaction between the compound I and the compound II is optimally carried out at room temperature (about 15° to about 30° C.), but can, if desired, be accelerated by heating. A reaction solvent is not always required but, if desired, any solvent which does not hinder the reaction may be employed. Solvents which can be used for this purpose comprise, for example, alcohols such as methanol or ethanol, ketones, such as acetone or methylethylketone, hydrocarbons such as benzene, toluene, xylene or the like. Other conditions such as reaction temperature and reaction time are suitably selected in accordance with the amount and particular nature of the starting materials or of the reaction solvent.

When the amidine is available in the acid salt form, as e.g. in the form of the hydrochloric acid salt, the sulfuric acid salt, etc., such salt is first converted into the free base form by reacting therewith the theoretical amount of alcoholate, whereupon the free amidine base (rather than the acid salt) is reacted with the 1,2,3-trichloro-2-cyano-propane. The thus-obtained reaction mixture is then subjected to hydrolysis, directly or after separation and/or purification. The hydrolysis is carried out in per se known manner, for example by the action of water on the reaction mixture, while heating. In this way, the desired 2-substituted-4-amino-5-acylamidomethyl-pyrimidine of Formula III is produced.

The desired compound III is useful as an intermediate in the preparation of Vitamin $B_1$ or its derivatives. Thus, compound III is used to prepare the corresponding compound containing —$CH_2NH_2$ in lieu of —$CH_2NHCOR$, whereupon Vitamin $B_1$ or the corresponding derivative is prepared according to U.S. Pat. No. 2,592,930.

In the following illustrative embodiments of presently preferred examples, the relationship between parts by weight and parts by volume is the same as that between milli-liters and grams.

Example 1

20.7 parts by weight of metallic sodium is admixed with 200 parts by volume of methanol to prepare a methanol solution containing sodium methylate. To this methanol solution there is added 94.6 parts by weight of acetamidine hydrochloride, and the mixture is vigorously agitated at room temperature for one hour, followed by subjecting the mixture to filtration to remove sodium chloride.

To the filtrate, there is added 17.2 parts by weight of 1,2,3-trichloro-2-cyanopropane, followed by removing 100 parts by volume of methanol, e.g. by distillation.

The resultant mixture is then refluxed for 10 hours.

The methanol is distilled off, and to the residue there is added 60 parts by volume of water, followed by heating at 90° C for one hour to allow hydrolysis to take place.

The precipitates obtained on cooling are recrystallized from water to obtain 11.5 parts by weight of 2-methyl-4-amino-5-acetamidomethylpyrimidine having half a mole of water of crystallization and melting at 203–204° C.

Example 2

11.5 parts by weight of metallic sodium is admixed with 150 parts by weight of methanol to prepare a methanol solution containing sodium methylate. To this methanol solution is added 52.0 parts by weight of acetamidine hydrochloride, and the mixture is vigorously agitated at room temperature for one hour, followed by subjecting the mixture to filtration to remove sodium chloride.

To the filtrate there is added 17.2 parts by weight of 1,2,3-trichloro-2-cyanopropane, followed by distilling off 70 parts by volume of methanol.

The mixture is then treated as in Example 1 to give 7.6 parts by weight of 2-methyl-4-amino-5-acetamidomethylprimidine having half a mole of water of crystallization.

Example 3

To a solution of 29 parts by weight of acetamidine in 50 parts by volume of benzene there is added a solution of 8.6 parts by weight of 1,2,3-trichloro-2-cyanopropane in 50 parts by volume of benzene at below 10° C, followed by heating the mixture under reflux for 8 hours.

Removal of the solvent from the resultant solution under reduced pressure gives a residue, to which is added 20 parts by volume of water. The mixture is heated at 90° C. for one hour to allow hydrolysis to take place.

Thus-obtained mixture is then treated as in Example 1 to give 5.7 parts by weight of 2-methyl-4-amino-5-acetamidomethylpyrimidine having half a mole of water of crystallization.

Example 4

To 8.6 parts by weight of 1,2,3-trichloro-2-cyanopropane, there is added dropwise 20 parts by weight of acetamidine under cooling, followed by addition of 20 parts The mixture is then heated at 90° C. for one hour.

After the resultant reaction, water is distilled off from the reaction mixture, and then the residue is extracted with chloroform. Analysis of the chloroform layer by means of paper-chromatography shows that 2.1 parts by weight of 2-methyl-4-amino-5-acetamidomethylpyrimidine is produced.

Example 5

5.7 parts by weight of metallic sodium is admixed with 100 parts by volume of methanol to prepare a methanol solution containing sodium methylate. To this methanol solution, there is added 27.2 parts by weight of propioamidine hydrochloride, and the mixture is agitated at room temperature for 30 minutes.

To the obtained mixture, there is added 8.6 parts by weight of 1,2,3-trichloro-2-cyanopropane and the whole mixture is heated under reflux for 8 hours, followed by removing sodium chloride. The filtrate is concentrated to dryness under reduced pressure. The concentrate is extracted with acetone and the extract is concentrated to dryness, to which there is added 10 parts by volume of water, and the aqueous solution is heated at 90° C. for one hour.

The resultant product is subjected to distillation to remove water and then is purified by chromatography on alumina to obtain 5.1 parts by weight of 2-ethyl-4-amino-5 - propionylamidomethylpyrimidine melting at 187–189° C.

Example 6

5.7 parts by weight of metallic sodium is admixed with 100 parts by volume of methanol to prepare methanol solution containing sodium methylate.

To this methanol solution there is added 4.5 parts by weight of benzamidine, and the mixture is agitated at room temperature for 30 minutes.

To the obtained mixture there is added 8.6 parts by weight of 1,2,3-trichloro-2-cyanopropane and the whole mixture is heated under reflux for 8 hours, followed by removing sodium chloride. The filtrate is then concentrated to dryness.

The obtained dried substance is washed with water and then dissolved in a mixture of 40 parts by volume of sodium hydroxide (10%) and 120 parts by volume of ethanol, followed by heating on a water bath for 3 hours.

Insolubles are filtered off from the reaction mixture, and then the filtrate is cooled to give 2.1 parts by weight of 2-phenyl-4-amino - 5 - benzoylamidomethylpyrimidine melting at 233–235° C.

What is claimed is:

1. A process for the production of a compound of the formula

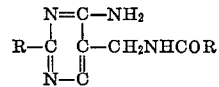

in which R is ethyl or methyl, which comprises contacting an amidine of the formula

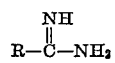

in which R has the meaning above, with 1,2,3-trichloro-2-cyanopropane and subjecting the resultant compound to hydrolysis by the action of water without the addition of an acid or alkaline substance.

2. A process according to claim 1, wherein the amidine is acetamidine and the product is 2-methyl-4-amino-5-acetamidomethylpyrimidine.

3. A process according to claim 1, wherein the amidine is propioamidine and the product is 2-ethyl-4-amino-5-propionylamidomethylpyrimidine.

References Cited

UNITED STATES PATENTS 2,592,930   4/1952   Matsukawa et al. _____ 260—256.6

ALEX MAZEL, Primary Examiner

R. J. GALLAGHER, Assistant Examiner

U.S. Cl. X.R.

204—158; 260—251.5, 465.7